United States Patent Office

3,424,716
Patented Jan. 28, 1969

3,424,716
STABILIZED DYEABLE POLYMERS
Allen Noshay, East Brunswick, and William S. Smith, Jr., Elizabeth, N.J., assignors to Esso Research and Engineering Company, a corporation of Delaware
No Drawing. Filed Sept. 1, 1965, Ser. No. 484,426
U.S. Cl. 260—45.75                12 Claims
Int. Cl. C08f 45/58, 47/04

ABSTRACT OF THE DISCLOSURE

Polyolefin fibers which are both white and dyeable are produced by blending the polyolefin, prior to formation of the fibers, with a nickel compound, a sulfur-containing heat stabilizer, and n-octyl phenyl salicylate.

---

This invention relates to alpha olefin polymers which are stabilized, dyeable, and capable of being formed into fibers without discoloring.

Poly alpha olefins have found increasing interest as textile fibers and materials because of their desirable properties of strength and low cost. One of the problems encountered in their development has been the poor dye acceptance of such fibers because of the inertness of a hydrocarbon polymer. Although poly alpha olefinic materials such as polypropylene can be dyed, their fastness to various environments has been inadequate. One method of improving the dyeability of these materials has been by the incorporation of nickel compounds in the polymer to serve as dyesites for chelatable dyes (see for example copending application Ser. No. 336,050, filed Jan. 6, 1964). However, these nickel compounds, at high temperatures of spinning or extrusion, tend to react with the stabilizers, which are conventionally dispersed in the polymer, thus discoloring the resulting product prior to dyeing. Reaction with U.V. stabilizers produces green discoloration and reaction with sulfur-containing heat stabilizers produces gray or black discoloration. While compounds such as nickel acetate avoid gray discoloration at temperatures up to about 570° C., many commercial spinning units operate at temperatures in excess of 570° C. and even nickel acetate will cause gray discoloration at such high temperatures in the presence of sulfur-containing heat stabilizers.

It has now been found that white, dyeable, stabilized compositions may be produced from blends of alpha olefin polymers which contain a nickel compound, a sulfur-containing heat stabilizer and a stabilizing amount of n-octyl phenyl salicylate. The n-octyl phenyl salicylate has several advantages:

(1) It serves as an effective U.V. stabilizer;
(2) It does not react with the nickel compounds to cause green discoloration; and
(3) It suppresses reaction between the sulfur-containing heat stabilizers and nickel compounds thus avoiding gray discoloration.

More specifically, the invention subsists in blending an alpha olefin polymer with about 0.1 to 20.0 wt. percent, preferably 0.2 to 5.0 wt. percent of a nickel compound, and stabilizing amounts of a sulfur-containing heat stabilizer and n-octyl phenyl salicylate. In general "stabilizing amounts" of additives are contemplated to be about 0.1 to 2.0 wt. percent, preferably about 0.3 to 1.0 wt. percent. The term "wt. percent" as used in this application means the weight of additive relative to the weight of the unblended polymer.

The polymer blend is then spun at temperatures up to and exceeding 600° F. to yield white fibers which are stabilized, and dyeable with improved fastness to light, washing, and dry cleaning.

While this invention is principally directed to the dyeing of fibers of filaments, it may also be used to produce dyeable poly alpha olefin films, foils, and other formed products.

The polymers treated by the process of the invention are alpha olefin homopolymers and copolymers. The alpha olefin homopolymer can be prepared by any known process, such as the so-called Ziegler process, see for example Belgian Patent 533,362 and Belgian Patent 538,782. Examples of homopolymers within the scope of the invention include polyethylene, polypropylene, poly 1-butene and poly 1-heptene. Polymers or copolymers of branched chain alpha olefins where the branching occurs no closer than the third carbon atom can also be employed, such as poly 4,4-dimethyl-1-pentene, poly 4-methyl-1-pentene and poly 3-methyl-1-butene. In general, the homopolymers are prepared from alpha olefins having from 2 to 12 carbon atoms. The copolymers employed in the process of the invention include copolymers of two different alpha olefins such as ethylene-propylene copolymers, ethylene-1-hexene copolymers and alpha olefin-aromatic olefin copolymers containing from 1 to 15% by weight of an aromatic olefin, such as, for example, copolymers of styrene and 4-methyl-1-pentene. Also, blends of one or more of the previously mentioned polymers can be employed. The polymers and copolymers employed in the invention have viscosity average molecular weights ranging from 100,000 to 1,000,000. The preferred polymers and copolymers of the invention are those prepared by the use of alkyl metal catalysts. Most preferred is polypropylene. Catalysts which are useful in this process are mixtures of reducible heavy transition metal compounds and reducing metal containing substances, or mixtures of partially reduced heavy transition metal compounds and organometallic activators. Examples of these catalysts are $TiCl_4 + AlEt_3$ and $TiCl_3 + AlEt_3$.

The heat stabilizers of this invention include all sulfur-containing compounds which are useful for the heat stabilization of thermoplastics. Some examples of these stabilizing agents which contain sulfur are: di-tert-octyl trisulfide, di-tert-octyl tetrasulfide, 4,4' thiobis (2-t-butyl-5-methylphenol), dilaurylthiodipropionate, distearylthiodipropionate, the esters of polysulfides derived from mercaptopropionic acid, zinc dibutyl dithiocarbamate, and zinc sulfide. Preferred is dilaurylthiodipropionate.

Any nickel compound may be dispersed in the polymer to provide dyesites for chelatable dyes. Thus, nickel compounds which are inorganic or organic, soluble or insoluble in poly alpha olefins may be used in the invention so long as they do not decompose at the temperatures and pressures necessary for spinning fibers. When the nickel compound is insoluble, it should be finely ground to effect a uniform dispersion of the compound throughout the polymer melt. Soluble nickel organic compounds are generally preferred since they are more easily dispersed. Some nickel compounds such as nickel carbonate are less satisfactory since they are less prone to chelate with the dyes than other compounds but even nickel carbonate can serve as a dyesite additive if enough is used. Representative nickel compounds are nickel chloride, nickel sulfate, nickel acetate, nickel stearate, nickel pelargonate, nickel 2-ethyl hexanoate, nickel myristate, nickel ethylene diamine, nickel fumarate, nickel terephthalate, and nickel alanine.

The preferred compounds are nickel stearate, nickel acetate, and nickel 2-ethyl hexanoate. Most preferred is nickel 2-ethyl hexanoate, which is soluble in poly alpha olefins and has a high chelating activity.

The dyes which are useful in this invention are chelatable dyes. These include the "Koprolene" dyes and the "National Polypropylene" series of dyes produced by the Koppers Company and the National Aniline Company respectively. Examples of these are Koprolene Garnet R, Koprolene Blue R, Polypropylene Violet 3BR, Polypropylene Green B, Polypropylene Brilliant Blue B and Polypropylene Brilliant Orange R. Also useful are ortho hydroxy azo dyes. These dyes include mono-azo dyes, conjugated di- and multi-azo dyes as well as azo-pyrazolone, O,O'-dihydroxy azo and o-hydroxy-o-carboxy azo type dyes. Examples of these are Orasol Yellow 3G (Solvent Yellow 17), Sudan Orange RRA (Solvent Orange 7), Sudan Red 4BA (Oil Red 24), and Oil Red O (Solvent Red 27), and benzothiazole-containing ortho hydroxy azo dyes.

The formulas for some of these ortho hydroxy azo dyes are shown below:

Orasol Yellow 3G (Solvent Yellow 17)

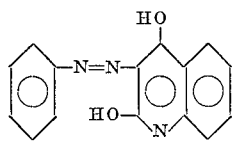

Sudan Orange RRA (Solvent Orange 7)

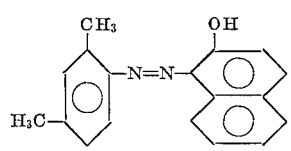

Sudan Red 4BA (Oil Red 24)

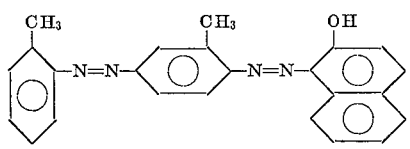

Oil Red O (Solvent Red 27)

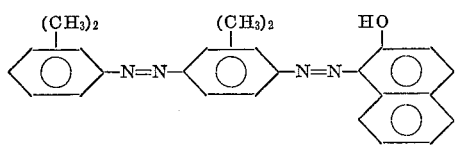

6 methoxy, 2-amino benzothiazole coupled with 3,4-xylenol

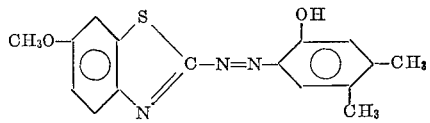

6 methoxy, 2-amino benzothiazole coupled with β naphthol

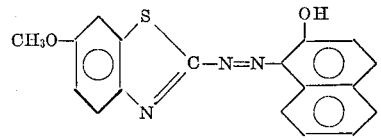

The polymer blend which has been melt spun or extruded into fibers or molded objects is contacted with the aqueous dye bath. In general the dye baths employed contain from 0.1 to 10 wt. percent of dye based on the weight of the goods to be dyed. The temperature of dyeing and the time of immersion depend on the concentration of nickel compound in the blend, the particular nickel compound employed, the concentration of dye employed, and the intensity of color desired. These parameters can easily be determined by routine experimentation. The temperature of dyeing is not critical although the dye bath is usually maintained at the boiling point.

This invention will be more fully understood by reference to the following examples.

Example 1

A polypropylene polymer was formed by passing propylene gas into a dispersion containing Al(Et)$_3$ and TiCl$_3$ in an aromatic diluent at a temperature of 80° C. Hydrogen was used to control the molecular weight. A crystalline polypropylene resulted having an intrinsic viscosity of 1.7 (in tetralin at 120° C.) and a melt index of 16. This polymer was blended with 0.5 wt. percent of dilaurylthiodipropionate as a stabilizer and then spun into fibers by methods known in the art. When these fibers were contacted with the dyes suitable for this invention such as the National Polypropylene dyes, Koprolene dyes, Orasol Yellow 3G, and 6 methoxy, 2-amino benzothiazole coupled with β naphthol, little dye pickup and essentially no fastness were observed.

Example 2

The polypropylene of Example 1 was blended with various additives and then spun into fibers. The procedure used was as follows:

The polymer resin was dry blended with the appropriate sulfur-containing heat stabilizer, U.V. stabilizer and nickel dyesite additive until a uniform mixture was obtained. The blend was then melt spun into fibers between 500–600° F. The spun fibers were then drawn 4.5× their original length in order to impart the desired orientation and properties.

In Table I, below, is tabulated the data collected from this experiment. It is to be noted that at high temperatures only formulations containing n-octyl phenyl salicylate (OPS) in combination with a heat stabilizer and a nickel compound produced white fibers. Other formulations produced discolored fibers. The advantages of white fibers are obvious to the art since discolored fibers are not useful in applications where white fibers are used and, additionally, when dyed they tend to produce muddy hues.

TABLE I

| Sample | Ni compound | UV stabilizer | S-containing heat stabilizer | Spin temp. (° F.) | Fiber color |
|---|---|---|---|---|---|
| 1 | 0.66% Ni acetate | None | None | 500 | White. |
|  |  |  |  | 600 | Do. |
| 2 | do | do | 0.7% DLTDP [1] | 500 | Do. |
|  |  |  |  | 570 | Off-white. |
|  |  |  |  | 600 | Gray. |
| 3 | do | 0.5% UV 531 [2] | 0.7% DLTDP [1] | 500 | Brt. yellow-green. |
|  |  |  |  | 570 | Dull yellow-green. |
|  |  |  |  | 600 | Gray. |
| 4 | do | 0.5% Tinuvin 327 [3] | 0.7% DLTDP [1] | 500 | White. |
|  |  |  |  | 570 | Off-white. |
|  |  |  |  | 600 | Gray. |
| 5 | do | 1% Uvinul N-539 [4] | 0.7% DLTDP [1] | 500 | White. |
|  |  |  |  | 570 | Off-white. |
|  |  |  |  | 600 | Gray. |
| 6 | do | 1% OPS [5] | 0.7% DLTDP [1] | 500 | White. |
|  |  |  |  | 570 | Do. |
|  |  |  |  | 600 | Do. |
| 7 | 0.64% Ni-2 ethyl hexanoate | None | None | 500 | Do. |
|  |  |  |  | 600 | Do. |
| 8 | do | 0.75% UV 531 | 0.7% DLTDP | 500 | Do. |
|  |  |  |  | 520 | Lt. gray. |
|  |  |  |  | 585 | Dk. gray. |
| 9 | do | 1% OPS | 0.7% DLTDP | 500 | White. |
|  |  |  |  | 550 | Do. |
|  |  |  |  | 600 | Off-white. |
| 10 | 1.04% Ni stearate | None | 0.7% DLTDP | 500 | White. |
|  |  |  |  | 520 | Lt. gray. |
|  |  |  |  | 600 | Dk. gray. |
| 11 | do | 1% OPS | 0.7% DLTDP | 500 | White. |
|  |  |  |  | 550 | Do. |
|  |  |  |  | 575 | Off-white. |
| 12 | 0.64% Ni-2 ethyl hexanoate | do | 2.0% ZnS | 500 | White. |
|  |  |  |  | 550 | Do. |
|  |  |  |  | 600 | Light gray. |

[1] Dilaurylthiodipropionate.
[2] 2-hydroxy, 4-octoxy benzophenone.
[3] Substituted hydroxyphenyl benzotriazole.
[4] Substituted acrylonitrile.
[5] n-Octyl phenyl salicylate.

Example 3

Sample No. 9 of Example 2 had the following physical properties:

Denier/filaments _____ 165/34
Tenacity _____g.p.d__ 3.7
Fadeometer ageing, hours to 50% strength retention _____ 500
Oven ageing in air, 225° F., days to 50% strength retention _____ 30

This sample which was knit into a fabric was then dyed with dyes of Example 1 by methods known in the art. Briefly, the fabric was scoured, rinsed, and then set in a boiling dye bath. The fabric was kept in the dye bath for one hour and then rinsed and dried. Deep dyeings were obtained and the dyed fabric showed excellent fastness to light, washing, and dry cleaning (perchloroethylene).

This invention has been described in connection with certain specific embodiments thereof; however, it should be understood that these are by way of example rather than by way of limitation, and it is not intended that the invention be restricted thereby.

What is claimed is:

1. A dyeable, white fiber formed from a polymer of a hydrocarbon alpha olefin blended with 0.1 to 20 wt. percent of a nickel compound serving as a dyesite additive, a stabilizing amount of a sulfur-containing heat stabilizer, and a stabilizing amount of n-octyl phenyl salicylate.

2. The composition of claim 1 wherein the nickel compound is soluble in poly alpha olefins.

3. The composition of claim 1 wherein the nickel compound is selected from nickel stearate, nickel 2-ethyl hexanoate and nickel acetate.

4. The composition of claim 3 wherein the heat stabilizer is dilaurylthiodipropionate.

5. The composition of claim 4 wherein the polymer is polypropylene.

6. The composition of claim 5 wherein the nickel compound is nickel 2-ethyl hexanoate.

7. The composition of claim 6 which contains 0.2 to 5.0 wt. percent of the nickel 2-ethyl hexanoate.

8. In the high temperature preparation of dyeable poly alpha olefin fibers which contain a sulfur-containing heat stabilizer and 0.1 to 20 wt. percent of a nickel compound to enhance dyeability, the improvement which comprises: a method for suppressing reaction between the nickel compound and the heat stabilizer by adding to the poly alpha olefin a stabilizing amount of n-octyl phenyl salicylate.

9. The method of claim 8 wherein the poly alpha olefin is polypropylene.

10. The method of claim 9 wherein the heat stabilizer is dilaurylthiodipropionate.

11. The method of claim 10 wherein the nickel compound is nickel 2-ethyl hexanoate, which is present in the amount of 0.2 to 5.0 wt. percent.

12. The method of claim 11 wherein the amount of n-octyl phenyl salicylate is present in the amount of 0.3 to 1.0 wt. percent.

References Cited

UNITED STATES PATENTS 3,043,797  7/1962  Addleburg et al. ____ 260—45.85
3,163,492  12/1964  Thomas _____ 8—55

DONALD E. CZAJA, Primary Examiner.

V. P. HOKE, Assistant Examiner.

U.S. Cl. X.R.

8—55; 260—45.7, 45.85, 45.95